(12) United States Patent
Kano

(10) Patent No.: US 6,971,796 B2
(45) Date of Patent: Dec. 6, 2005

(54) LINEAR GUIDE APPARATUS

(75) Inventor: Kenji Kano, Saitama (JP)

(73) Assignee: NSK Ltd., Tokyo (JP)

( * ) Notice: Subject to any disclaimer, the term of this patent is extended or adjusted under 35 U.S.C. 154(b) by 148 days.

(21) Appl. No.: 10/692,744

(22) Filed: Oct. 27, 2003

(65) Prior Publication Data

US 2004/0131288 A1 Jul. 8, 2004

(30) Foreign Application Priority Data

Oct. 28, 2002 (JP) ............................ P.2002-312747

(51) Int. Cl.[7] ............................................. F16C 29/06
(52) U.S. Cl. ...................................................... 384/45
(58) Field of Search ............................. 384/45, 44, 43; 464/168

(56) References Cited

U.S. PATENT DOCUMENTS

2003/0053724 A1 * 3/2003 Matsui et al. .................. 384/45
2003/0161557 A1 * 8/2003 Ishihara et al. ................ 384/45

* cited by examiner

Primary Examiner—Lenard A. Footland

(74) Attorney, Agent, or Firm—Sughrue Mion, PLLC

(57) ABSTRACT

A linear guide apparatus has: a guide rail having rolling grooves at two side portions thereof and extended in an axial direction; and a slider having: rolling grooves opposed to the rolling grooves of the guide rail; a slider main body having a rolling element path; and an end cap having a rolling element circulating portion for communicating the two rolling grooves and the rolling element path and fixed to two end faces of the slider main body via screws, the slider relatively moving and being guided by the guide rail via rolling of a number of rolling elements inserted between the two rolling grooves, wherein through holes for the screws are provided at at least four corners of the end cap and at least a portion of a face of the end cap for attaching to the end face of the slider main body is constituted by a projected curved face.

4 Claims, 3 Drawing Sheets

LINEAR GUIDE APPARATUS

BACKGROUND OF THE INVENTION

1. Field of the Invention

The present invention relates to a linear guide apparatus used in an industrial machine or the like.

2. Description of the Related Art

As shown by, for example, FIG. 6, there is known a linear guide apparatus of this kind of a prior art having a guide rail 1 extended in an axial direction and a slider 2 mounted on the guide rail 1 relatively movably in the axial direction.

Two side faces of the guide rail 1 are formed with rolling grooves 3 respectively extended in the axial direction and a slider main body 2A of the slider 2 is formed with rolling grooves 31 respectively opposed to the rolling grooves 3 at inner side faces of two sleeve portions 4 thereof.

Further, a number of balls B as rolling elements are rollably interposed between the two rolling grooves 3 and 31 opposed to each other and the slider 2 can be moved on the guide rail 1 relatively along the axial direction via rolling movement of the balls B.

In accordance with the movement, the balls B interposed between the guide rail 1 and the slider 2 are moved to end portions of the slider 2 and in order to continuously move the slider 2 in the axial direction, the balls B need to circulate endlessly.

Therefore, rolling element endless circulating passages are constituted by further forming rolling element paths 8 in a linear shape penetrated in the axial direction in the sleeve portions 4 of the slider main body 2A, fixing end caps 5 each comprising an injection-molded product of a synthesized resin respectively at two ends on front and rear sides of the slider main body 2A via screws 12 and forming rolling element circulating portions 6 curved in a shape of a semicircular arc for communicating the two rolling grooves 3 and 31 and the rolling element paths 8. Further, in the drawing, notation 10 designates a tap hole for screwing to fix the end cap 5 to an end face of the slider main body 2A, notation 11 designates a side seal and notation 13 designates a grease feeding nipple provided at a side face, an end face or the like of the end cap.

However, according to the linear guide apparatus of the prior art, in order to constrain a load applied to a tongue for scooping up the ball B when the ball B circulating the rolling element endless circulating passage is brought to the rolling element circulating portion 6 of the end cap 5, the load is constrained by arranging a through hole of the screw 12 on a side of the end cap 5 at a vicinity of the rolling element circulating portion 6 and utilizing a fastening force of the screw 12.

Therefore, there is a concern of deteriorating operability by deforming the rolling element circulating portion 6 of the end cap 5 by the fastening force of the screw 12.

Further, when a face of the end cap 5 for attaching to the end face of the slider main body 2A is a plane, there is a possibility that a small clearance is produced between the end cap 5 and the slider main body 2A by influence of flatness of both of the attaching faces of the end cap 5 and the slider main body 2A and a lubricant leaks from a grease feeding groove provided at the end cap 5.

SUMMARY OF THE INVENTION

The present invention has been carried out in order to resolve such a drawback and it is an object thereof to provide a linear guide apparatus capable of constraining a load applied to a tongue when a rolling element circulating on a rolling element endless circulating passage is brought to a rolling element circulating portion of an end cap, capable of ensuring excellent operability by preventing the rolling element circulating portion from being deformed and capable of firmly preventing a lubricant from leaking from a grease feeding groove at the end cap.

In order to achieve the above-described object, the present invention according to a first aspect is a linear guide apparatus having: a guide rail having rolling grooves at two side portions thereof and extended in an axial direction; and a slider having: rolling grooves opposed to the rolling grooves of the guide rail; a slider main body having a rolling element path; and an end cap having a rolling element circulating portion for communicating the two rolling grooves and the rolling element path and fixed to two end faces of the slider main body via screws, the slider relatively moving and being guided by the guide rail via rolling of a number of rolling elements inserted between the two rolling grooves, wherein through holes for the screws are provided at at least four corners of the end cap and at least a portion of a face of the end cap for attaching to the end face of the slider main body is constituted by a projected curved face.

According to a second aspect of the present invention, there is provided that a linear guide apparatus as set forth in the first aspect, wherein an entire face of the face of the end cap is constituted by a projected curved face curved in a width direction of the slider main body.

According to a third aspect of the present invention, there is provided that a linear guide apparatus as set forth in the first aspect, wherein the portions of the screw through hole are constituted by a plane and the other portion is constituted by the projected curved face.

According to a fourth aspect of the present invention, there is provided that a linear guide apparatus as set forth in the first aspect, wherein an entire face of the face of the end cap is constituted by a projected curved face curved in a height direction of the slider main body.

DETAILED DESCRIPTION OF THE PREFERRED EMBODIMENTS

Embodiments of the present invention will be explained in reference to the drawings as follows.

Figure 1:
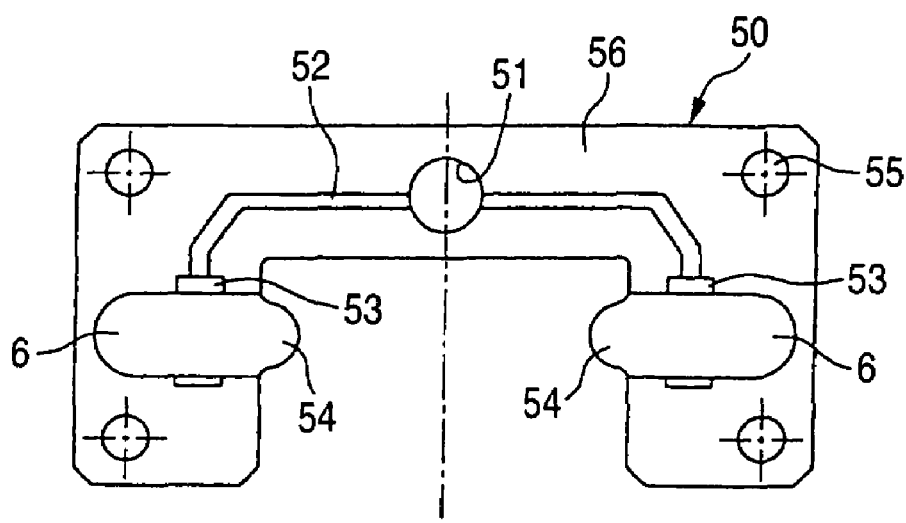
FIG. 1 is a plane view for explaining an end cap of a linear guide apparatus according to a first embodiment of the present invention.
Figure 2:
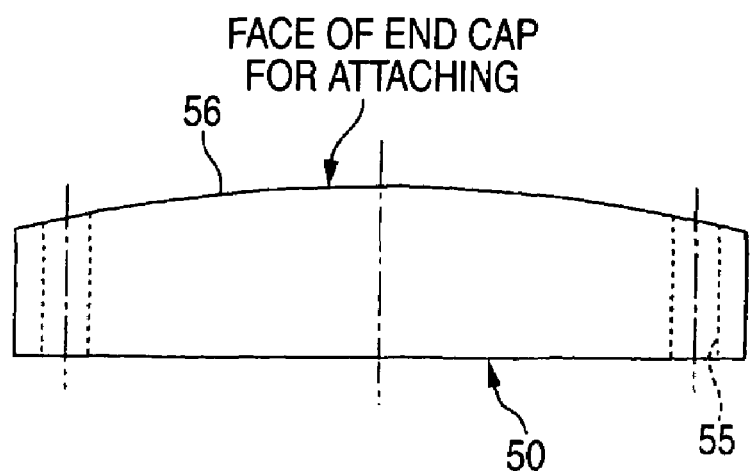
FIG. 2 is a view viewing the end cap from an upper side and is a view arranging a face thereof for attaching to an end face of a slider main body at the upper side.
Figure 3:
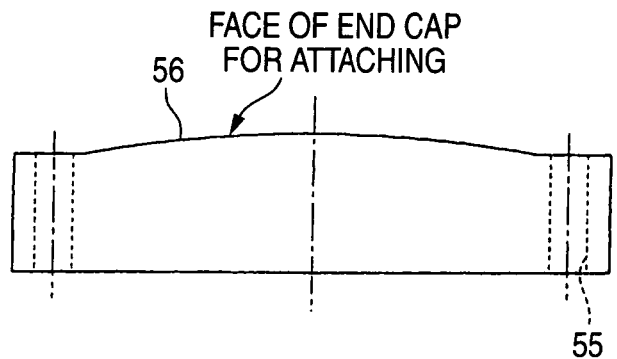
FIG. 3 is a view viewing an end cap of a linear guide apparatus according to a second embodiment of the present invention from an upper side and is a view arranging a face thereof for attaching to the end face of the slider main body at the upper side.
Figure 4:
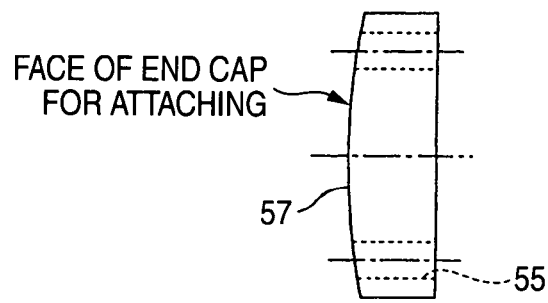
FIG. 4 is a view viewing an end cap of a linear guide apparatus according to a third embodiment of the present invention from a side direction and is a view for arranging a face thereof for attaching to the end face of the slider main body on a left side.
Figure 5:
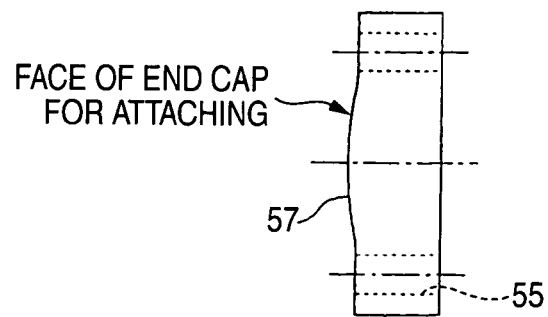
FIG. 5 is a view viewing an end cap of a linear guide apparatus according to a fourth embodiment of the present invention from a side direction and is a view for arranging a face thereof for attaching to the end face of the slider main body on a left side.
Figure 6:
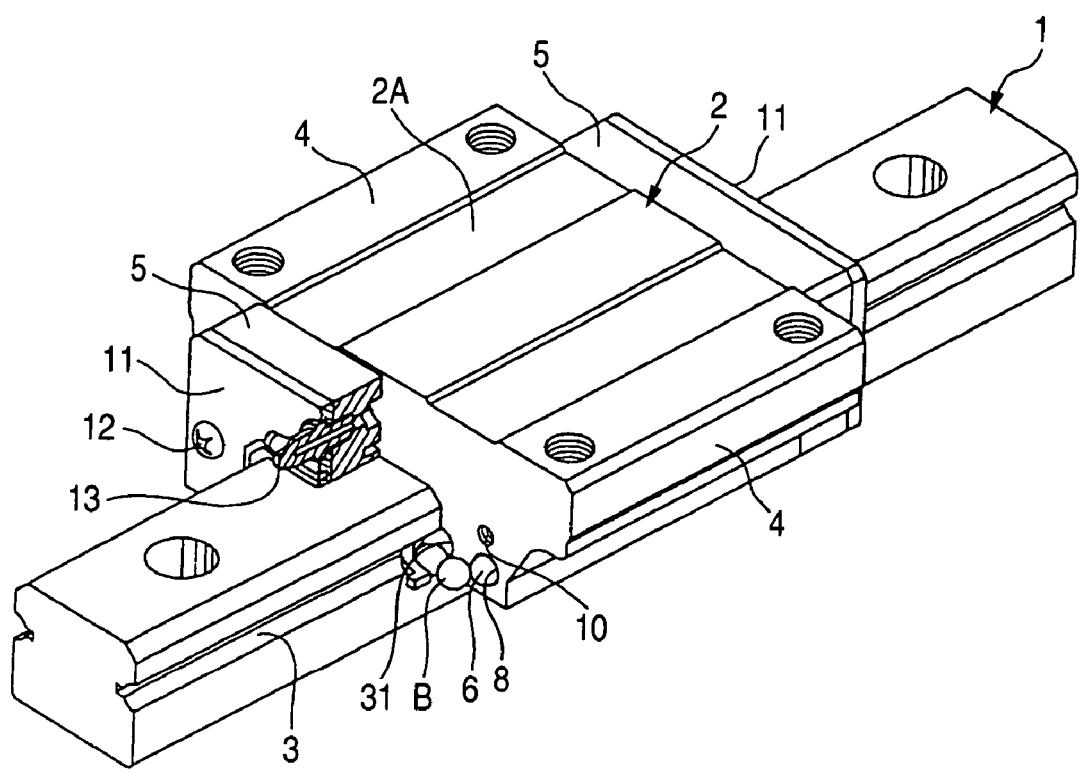
FIG. 6 is a partially broken perspective view of a linear guide apparatus of a prior art.

FIG. 1 is a plane view for explaining an end cap of a linear guide apparatus according to a first embodiment of the present invention, FIG. 2 is a view viewing the end cap from an upperside and is a view arranging a face thereof for attaching to an end face of a slide main body from the upper side and FIG. 3 through FIG. 5 are views for explaining other embodiments of the present invention. Further, in all of the respective embodiments only the end cap differs from that of the linear guide apparatus of the prior art explained in reference to FIG. 6 and therefore, an explanation will be given only of the different portion.

FIG. 1 is a view viewing an end cap 50 substantially in a channel-like shape comprising an injection-molded product of a synthetic resin or the like from a side of a face thereof for attaching to an end face of the slider main body 2A and in the drawing, notation 51 designates an attaching hole of the grease feeding nipple 13, notation 52 designates an oil feeding groove communicating the attaching hole 51 and the rolling element circulating portion 6 via a fitting hole 53 of a return guide (not illustrated) and notation 54 designates a tongue for scooping up the ball B when the ball B circulating the rolling element endless circulating passage is brought to the rolling element circulating portion 6 of the end gap 50.

In this case, according to the embodiment, through holes 55 of the screws 12 for fixing the end cap 50 to the end face of the slider main body 2A are formed at four corners of the end cap 50 and as shown by FIG. 2, an entire fade of a face of the end cap 50 for attaching to the end face of the slider main body 2A is constituted by a projected curved face 56 curved in a width direction of the slider main body 2A. Further, the tap holes 10 formed at the end face of the slider main body 2A are formed at four corners of the end face of the slider main body 2A in correspondence with the screw through holes 55.

Further, the end cap 50 is fixed to the end face of the slider main body 2A by arranging a side of the projected curved face 56 of the end cap 50 having the above-described constitution opposedly to the end face of the slider main body 2 and screwing the screws 12 inserted into the screw through holes 55 at the four corners of the end cap 50 into the tap holes 10 of the slider main body 2A to fasten.

At this occasion, the projected curved face 56 of the end cap 50 is elastically deformed to be brought into close contact with the end face of the slider main body 2A, thereby, a small clearance is prevented from being produced between the end cap 10 and the slider main body 2A, a drawback that a lubricant is leaked from the grease feeding groove provided at the end cap 50 can be avoided and the load applied to the tongue 54 can be constrained since a reaction force is operated in the axial direction by elastically deforming the projected curved face 56.

Further, since the screw 12 is fastened at a position remote from the rolling element circulating portion 6 of the end cap 50, excellent operability can be ensured by preventing the rolling element circulating portion 6 of the end cap 50 from being deformed by the fastening force.

Further, the present invention is not limited to the above-described embodiment but can pertinently be modified within a range not deviated from the gist of the present invention.

For example, although according to the embodiment, there is taken an example of a case in which the entire face of the face of the end cap 50 for attaching to the end face of the slider main body 2A is constituted by the projected curved face 56, instead thereof, as shown by FIG. 3, a portion of the screw through hole 55 may be constituted by a plane and the other portion may be constituted by projected curved face 56.

Further, although according to the above-described embodiment, the projected curved face 56 of the end cap 50 is constituted by the shape curved in the width direction of the slider main body 2A, instead thereof, as shown by FIG. 4, the entire face of the face of the end cap 50 for attaching to the end face of the slider main body 2A may be constituted by a projected curved face 57 curved in a height direction of the slider main body 2A. Also in this case, similarly, as shown by FIG. 5, the portion of the screw through hole 55 may be constituted by a plane and the other portion may be constituted by the projected curved face 57.

As is apparent from the above-described explanation, according to the present invention, there is achieved an effect of capable of constraining the load applied to the tongue when the rolling element circulating the rolling element endless circulating passage is brought to the rolling element circulating portion of the end cap, capable of ensuring the excellent operability by preventing the rolling element circulating portion from being deformed and capable of firmly preventing the lubricant from being leaked from the grease feeding groove provided at the end cap.

What is claimed is:

1. A linear guide apparatus comprising:
   a guide rail having rolling grooves at two side portions thereof and extended in an axial direction; and
   a slider having: rolling grooves opposed to the rolling grooves of the guide rail; a slider main body having a rolling element path; and an end cap having a rolling element circulating portion for communicating the two rolling grooves and the rolling element path and fixed to two end faces of the slider main body via screws, the slider relatively moving and being guided by the guide rail via rolling of a number of rolling elements inserted between the two rolling grooves,
   wherein through holes for the screws are provided at at least four corners of the end cap and at least a portion of a face of the end cap for attaching to the end face of the slider main body is constituted by a projected curved face.

2. A linear guide apparatus as set forth in claim 1, wherein an entire face of the face of the end cap is constituted by a projected curved face curved in a width direction of the slider main body.

3. A linear guide apparatus as set forth in claim 1, wherein the portions of the screw through hole are constituted by a plane and the other portion is constituted by the projected curved face.

4. A linear guide apparatus as set forth in claim 1, wherein an entire face of the face of the end cap is constituted by a projected curved face curved in a height direction of the slider main body.

* * * * *